United States Patent

[11] 3,555,257

[72] Inventor Robert L. Gray
Cupertino, Calif.
[21] Appl. No. 712,026
[22] Filed Mar. 11, 1968
[45] Patented Jan. 12, 1971
[73] Assignee Burroughs Corporation
Detroit, Mich.
a corporation of Michigan

[54] TRANSFLUXOR LOGIC CIRCUITS FOR PERFORMING THE EXCLUSIVE OR, HALF ADDER AND FULL ADDER OPERATIONS
8 Claims, 3 Drawing Figs.

[52] U.S. Cl. .......... 235/176, 307/88
[51] Int. Cl. .......... G06f 7/50
[50] Field of Search .......... 235/176; 340/174LC; 307/88

[56] References Cited
UNITED STATES PATENTS

| | | | |
|---|---|---|---|
| 3,196,280 | 7/1965 | Franks, Jr. .......... | 307/88 |
| 3,045,915 | 7/1962 | Kikoshima .......... | 235/176 |
| 3,433,973 | 3/1969 | Morris .......... | 307/88 |

*Primary Examiner*—Malcolm A. Morrison
*Assistant Examiner*—David H. Malzahn
*Attorney*—Carl Fissell, Jr.

ABSTRACT: Transfluxor logic circuits are described which make use of the fact that too much write current in the write windings has the same effect as not enough, i.e., the transfluxor is blocked.

An EXCLUSIVE OR circuit is illustrated in which the energization of one write winding unblocks the transfluxor whereas the energization of both write windings switches the transfluxor completely to the opposite blocked state. Half adder and full adder circuits using the same principle are also described.

INVENTOR.
ROBERT L. GRAY
BY Kevin C. McMahon
ATTORNEY

INVENTOR.
ROBERT L. GRAY
BY Kevin C. McMahon
ATTORNEY

TRANSFLUXOR LOGIC CIRCUITS FOR PERFORMING THE EXCLUSIVE OR, HALF ADDER AND FULL ADDER OPERATIONS

BACKGROUND OF THE INVENTION

This invention relates generally to magnetic logical circuits involving multiaperture cores and more particularly to multiaperture core logic circuits having a plurality of write windings on their major aperture.

A multiapertured core, or transfluxor, may generally comprise a round slab of magnetic material having a nearly rectangular hysteresis loop with a major aperture causing it to appear like a toroid. In addition, a minor aperture of smaller diameter is located substantially in the middle of the toroidal path at one point therealong. A control winding is passed through the major aperture, and a read winding and a sense winding are passed through the minor aperture. The core is placed in one stable reluctance condition by passing a sufficiently large current pulse of a first polarity through the control winding, so as to saturate the whole toroidal magnetic path including the inner and outer legs adjacent the minor aperture in one direction. This stable magnetic reluctance condition is referred to as the blocked state because the magnetic flux passing around the major aperture within the inner and outer legs formed by the minor aperture is saturated in the same direction. Current pulses applied to the read winding of alternate polarities and relatively substantial magnitudes are not able to change the flux linkage around the minor aperture so that no substantial voltage is induced in the sense winding.

In order to write information into the transfluxor a pulse tending to magnetize the material in the opposite direction is applied to the control winding or to another winding on the major aperture. This write pulse must be large enough to switch the direction of the flux around the major aperture including the inner leg of the minor aperture in the opposite direction but not large enough to block the core in the opposite direction by switching the flux to the outer leg of the minor aperture also in the same direction. Current pulses of alternate polarities then applied to the read winding switch the flux around the minor aperture and induce an output in the sense winding.

A more detailed description of the operation of the transfluxor may be found in an article entitled "The Transfluxor" by J. A. Rajchman and A. W. Lo appearing in the IRE Proceedings, V. 44, P. 321—32 Mar. 1956.

Ordinary magnetic cores and transfluxors have been used to produce logical OR and AND functions by simple combinations of windings and currents. However, no simple method for producing the EXCLUSIVE OR function exists. Also electronic or magnetic circuits used as half adders or full adders have been relatively complicated and therefore expensive.

OBJECTS AND SUMMARY OF INVENTION

It is therefore an object of this invention to simplify magnetic EXCLUSIVE OR circuits.

It is a further object of this invention to provide an improved EXCLUSIVE OR circuit using a transfluxor.

It is a still further object of this invention to provide improved half adder and full adder circuits using transfluxors.

In carrying out these and other objects of this invention there are provided transfluxor logic circuits, each transfluxor originally being blocked in one direction, including a plurality of write windings wound on the major aperture of each of said transfluxors for receiving selectively generated coincident write pulses, said coincident pulses each supplying a fraction of the current needed to write into the transfluxor or to block it in the opposite direction. Also provided is a read winding wound on the minor aperture of each of said transfluxors for receiving a read pulse to switch the flux around said minor aperture only if said transfluxor is in its unblocked state, and a sense winding through said minor aperture for sensing flux changes around said minor aperture.

Various other objects and advantages and features of this invention will become more fully apparent in the following specification with its appended claims and accompanying drawing in which:

DETAILED DESCRIPTION

This invention can best be understood by referring to the following detailed description of the illustrated embodiments. The logical circuits of this invention use the phenomenon that too much write current in the transfluxor has the same effect on the output when the transfluxor is read as insufficient write current.

Figure 1:
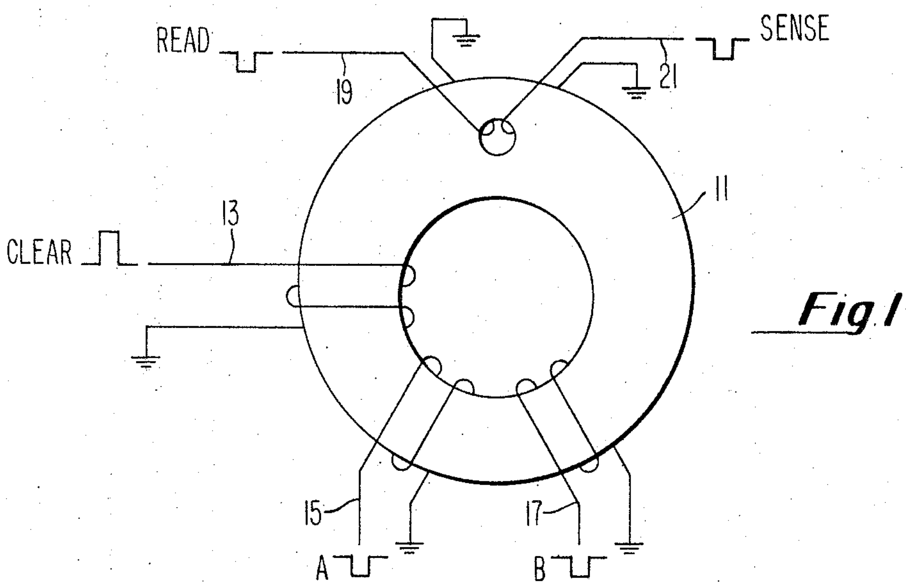
FIG. 1 is a schematic drawing of an embodiment of the transfluxor EXCLUSIVE OR circuit of the invention.

Referring now to FIG. 1 of the drawings there is illustrated a transfluxor EXCLUSIVE OR circuit embodiment of the invention. Transfluxor 11 has a clear winding 13, an A write winding 15, and a B write winding 17 wound on its major aperture. Read winding 19 and sense winding 21 are both wound on the minor aperture.

Originally transfluxor 11 is completely saturated, or blocked in the clockwise direction by means of a positive going pulse of sufficient magnitude in clear winding 13. While transfluxor 11 is in a blocked state read pulses in read winding 19 are unable to effect flux changes around the minor aperture since both the inner and outer legs of the minor aperture are saturated in the same direction and any pulse tending to switch one of the legs tends to drive the other further into saturation. For this reason, no output voltage can be generated in sense winding 21 while transfluxor 11 is blocked.

In order to write into the transfluxor either the A write winding 15 or the B write winding 17 is energized with a negative going pulse of sufficient magnitude to reverse the direction of the flux around the major aperture of the transfluxor, including the inner leg of the minor aperture, to the counterclockwise direction. The write pulse must not be large enough however, to reverse the direction of flux in the outer leg of the minor aperture as well. If the read winding 19 is now energized by a negative pulse of sufficient magnitude, the flux around the minor aperture is switched to a counterclockwise direction and an output voltage is induced in the sense winding 21.

If both the A write winding 15 and the B write winding 17 are energized with negative going pulses of the same magnitude as above, the flux in the entire transfluxor including both the inner and the outer legs of the minor aperture is switched to the counterclockwise direction. The transfluxor 11 is once again blocked, this time in the counterclockwise direction and the energization of the read winding 19 produces no output on the sense winding 21.

Thus it can be seen that the above-described transfluxor circuit performs an exclusive or function since an output is produced in sense winding 21 in response to the energization of read winding 19 if either an A write pulse or a B write pulse has been received and no output is produced in the sense winding 21 if neither or both the A and B write pulses have been recieved.

Figure 2:
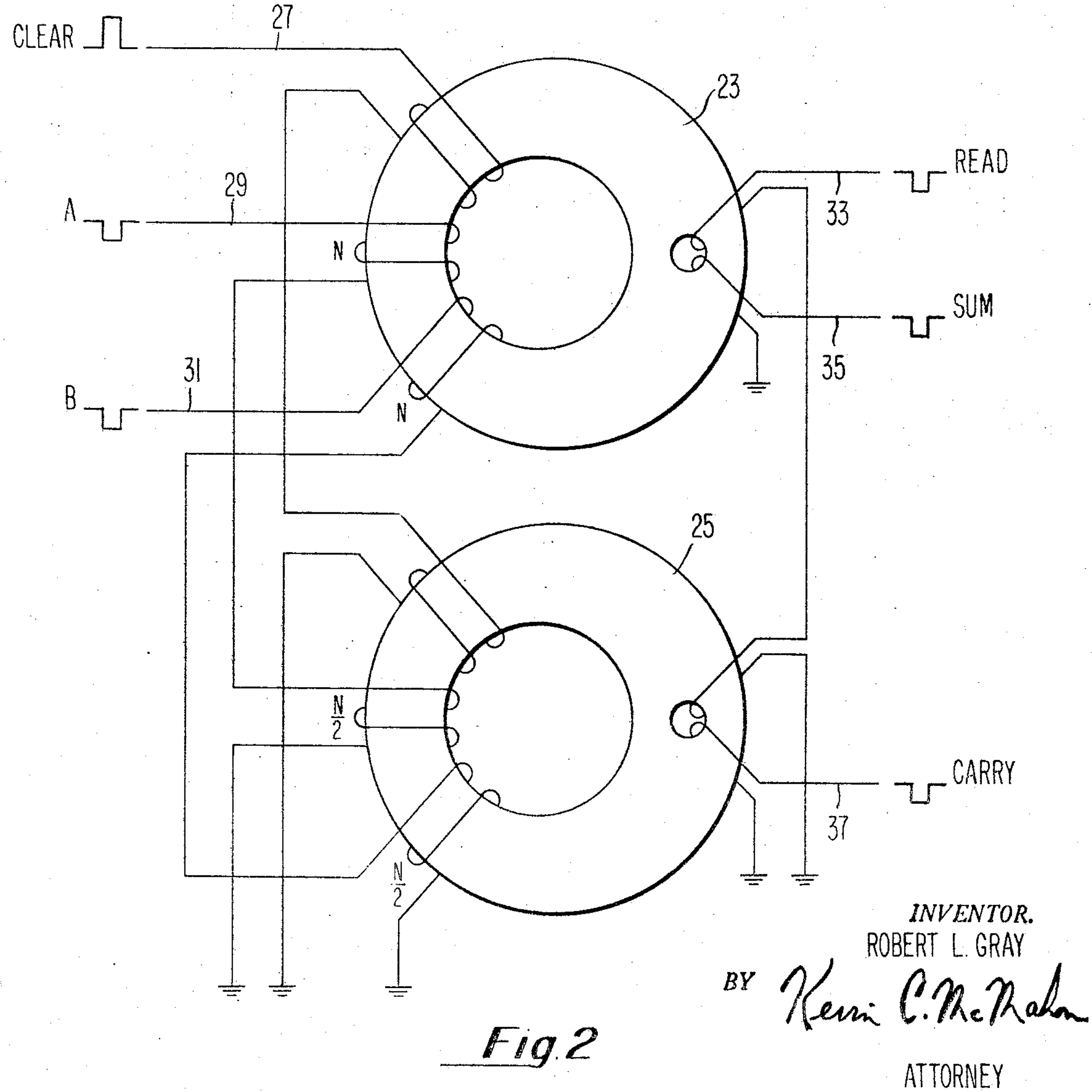
FIG. 2 is an embodiment of the transfluxor half adder of this invention.

A half adder embodiment of this invention, which is illustrated in FIG. 2 of the drawings, is constructed of transfluxors 23 and 25 which have clear winding 27 wound on their major apertures in series. The A write winding 29 and B write winding 31 are also each wound on the major apertures of the transfluxors 23 and 25 in series. Read winding 33 is wound in series on the minor apertures of transfluxors 23 and 25 and the sum winding 35 and carry winding 37 are wound on the minor apertures of transfluxors 23 and 25 respectively. The A write winding 29 and B write winding 31 each have half the number of turns on transfluxor 25 as they have on transfluxor 23.

A half adder must accept two inputs, A and B, and deliver a sum and a carry output according to the following equation:

$$\text{sum}=A\overline{B}+\overline{A}B$$

$$\text{carry}=AB$$

In the embodiment of the invention described in FIG. 2 transfluxor 23 is used to generate the sum output and transfluxor 25 is used to generate the carry output.

In operation clear winding 27 is energized with a positive going pulse of sufficient magnitude to block transfluxors 23 and 25 in the clockwise direction. If a negative going write pulse is received by the A write winding 29 or the B write winding 31 it sets transfluxor 23 to the unblocked state by reversing the flux around the major aperture including the inner leg of the minor aperture to the counterclockwise direction. Since the write windings on the transfluxor 25 have only half as many turns as the write windings on transfluxor 23 the write pulse is insufficient to unblock transfluxor 25.

If read winding 33 is now energized with a negative going read pulse of sufficient magnitude to reverse the flux around the minor apertures but not large enough to effect the flux direction in the rest of the transfluxor, the flux around the minor aperture of transfluxor 23 is reversed and a positive going output voltage is induced in sum winding 25. Since transfluxor 25 was not unblocked by the write pulse, no output is induced in carry winding 37.

If both the A and B windings are energized by negative going write pulses, sufficient flux is generated in transfluxor 23 to reverse the direction of all the flux in transfluxor 23 including the inner and outer legs of the minor aperture, thereby blocking the transfluxor 23 in the counterclockwise direction. Since there are only half as many turns in the write windings on transfluxor 23, the energization of both write windings reverses only the flux around the major aperture of the transfluxor 25 and does not effect the flux around the outer leg of the minor aperture. If the read winding 33 is now energized by a negative going pulse no sum output is induced in winding 35 since transfluxor 23 is blocked but a carry output is induced in line 37 caused by the reversal of the flux around the minor aperture of transfluxor 25.

It can therefore be seen that the circuit of FIG. 2 operates as a half adder since, if either the A or B inputs are energized a sum output is produced and if both the A and B inputs are energized only a carry output is produced. Of course, if neither the A nor the B windings are energized there is neither a sum nor a carry output since the transfluxors 23 and 25 remain blocked in the clockwise direction.

Figure 3:
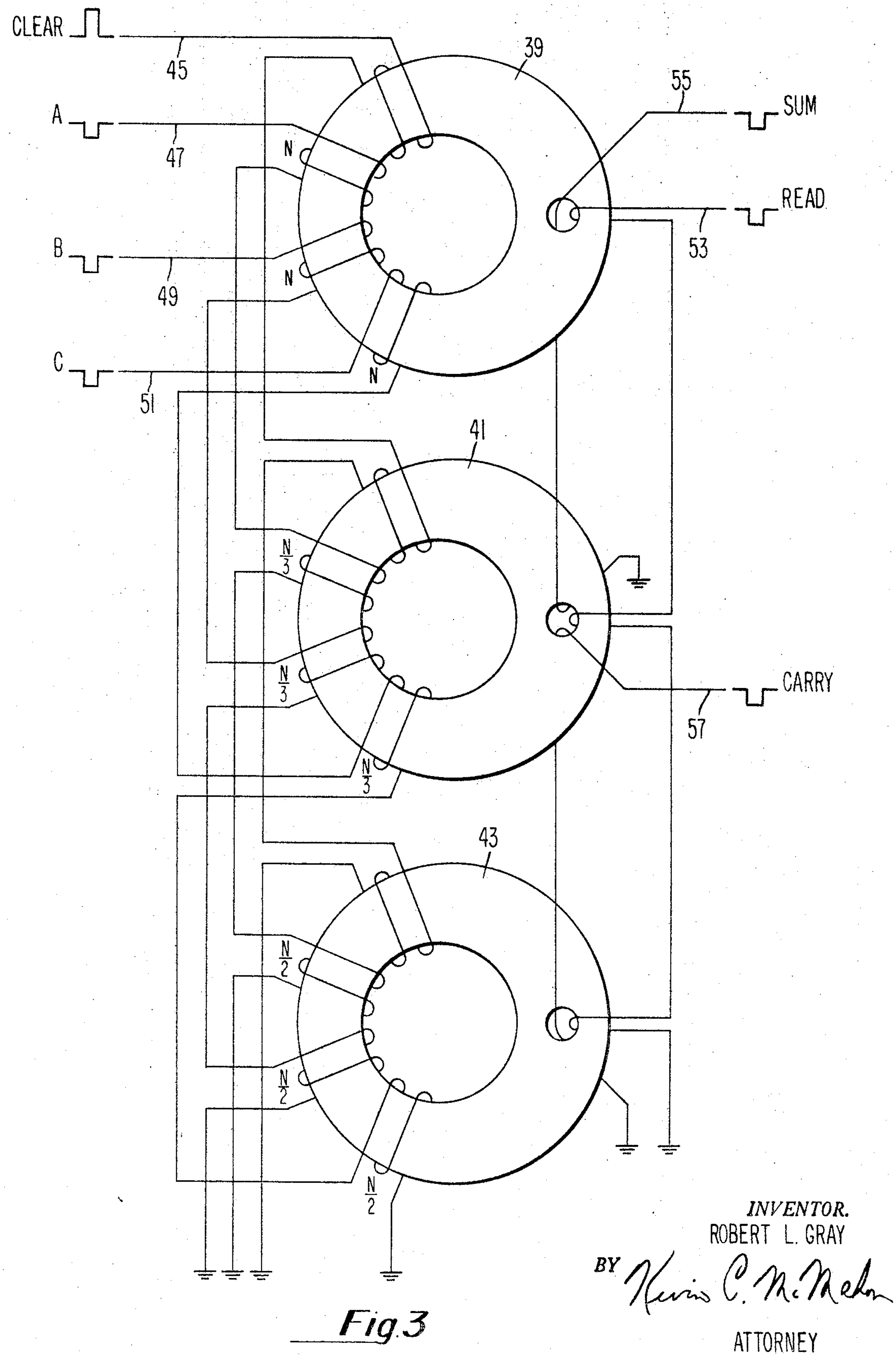
FIG. 3 shows an embodiment of the transfluxor full adder of this invention.

The full adder embodiment of the invention is illustrated in FIG. 3 of the drawings and includes three transfluxors 39, 41 and 43, having a clear winding 45 wound on their respective major apertures in series. The A write winding 47, the B write winding 49 and the C write winding 51 are also wound on the major apertures of the transfluxors 39, 41 and 43 in series. Each of the write windings has one-third as many turns on transfluxor 41 as it has on transfluxor 39 and has half as many turns on transfluxor 43 as it has on transfluxor 39.

Read winding 53 is wound on the minor apertures of all three transfluxors in series and sum winding 55 is wound on the minor apertures of the transfluxors 39 and 41. Carry winding 57 is wound on the minor apertures of transfluxors 41 and 43.

A full adder must accept three inputs, A, B and C, C being the carry from the preceding stage, and deliver a sum and a carry output according to the following equations:

$$\text{Sum}=A\overline{B}\overline{C}+\overline{A}B\overline{C}+\overline{A}\overline{B}C+ABC$$

$$\text{Carry}=AB\overline{C}+\overline{A}BC+A\overline{B}C+ABC$$

In other words a sum output occurs when either one or three inputs are present and a carry output occurs when two or three inputs are present.

In the illustrated embodiment of the full adder circuit of FIG. 3, transfluxor 39 produces a sum output if one of the three inputs is present and transfluxor 41 produces a sum output if all three of the inputs are present. Transfluxor 41 also produces a carry output when all of the three inputs are present and transfluxor 43 produces the carry output when any two of three inputs are present.

In operation, clear winding 45 is first energized with a positive going pulse of sufficient magnitude to set all three transfluxors to the clockwise blocked state. If one of the three write windings is then energized with the negative going write pulse, transfluxor 39 is switched to the unblocked state. Transfluxors 41 and 43, however, are unaffected since they have one-third and one-half respectively, the number of turns as transfluxor 39.

The energization of read winding 53 with a negative going read pulse results in a sum output caused by the switching of the flux on the minor aperture of transfluxor 39. No carry pulse is induced in carry winding 57, however, since transfluxors 41 and 43 are still unblocked.

If two of the three write windings are energized by negative going write pulses transfluxor 39 is switched to the counterclockwise blocked state, transfluxor 41 is unaffected and transfluxor 43 is switched to the unblocked state. A read pulse on read line 53 now induces a carry output on carry line 57 caused by the switching of the flux on the minor aperture of transfluxor 43. No output is induced in sum winding 55 since transfluxors 39 and 41 are blocked. If all three write lines 47, 49 and 51 are energized by a negative going write pulse transfluxors 39 and 43 are switched to the counterclockwise blocked state and transfluxor 41 is switched to the unblocked state. A read pulse now results in both a sum output on sum line 59 and a carry output on carry winding 57 caused by the switching of the flux on the minor aperture of transfluxor 41.

The full adder embodiment of the invention of FIG. 3 also illustrates how the EXCLUSIVE OR circuit of FIG. 2 may be generalized to any number of windings. Transfluxor 39 taken alone operates as a three winding EXCLUSIVE OR circuit in which the energization of any one write winding unblocks the transfluxor 39 so that an output can be produced. Transfluxor 41 operates as an AND circuit and the transfluxor may produce an output if all three of its write windings are energized. Clearly other combinations of numbers of windings and pulse strengths are possible to produce other desired functions.

It should be understood that the above description of the illustrated embodiments of this invention are given by way of example only and should not be construed as limitations on the scope of the invention. For instance, although the circuits have been described in relation to two hole transfluxors they would work just as well with transfluxors having a greater number of apertures. It should also be clear that although the multitransfluxor embodiments of the invention show the corresponding write windings for the various transfluxors being connected together in series it is also possible to connect them in parallel and include series resistors to control the amount of flux generated in each winding instead of using the turns ratio.

I claim:

1. A logical circuit including at least one transfluxor, each of said transfluxors having a major and a minor aperture, the latter being formed of an inner and an outer leg of magnetic material, and wherein the magnetic flux path of each of said transfluxors comprises said inner and outer leg together with the magnetic material around said major aperture which includes said inner leg, comprising:

means for setting each of said transfluxors to a blocked state by saturating substantially all of the magnetic material in said magnetic flux path in one stable direction of magnetic remanence;

a plurality of write windings on the major aperture of each of said transfluxors for receiving selectively generated write pulses, each of said write pulses being a fraction of the magnitude necessary to switch the flux around said major aperture to the opposite direction of magnetic remanence while leaving the direction of magnetization of the outer leg of said minor aperture unchanged so as to set the associated transfluxor to the unblocked state, said fraction being in the range between 1/N and 1, where N is the number of write windings on said associated transfluxor; and means cooperative with the minor apertures of said transfluxors for determining whether said transfluxors are in a blocked state.

2. The circuit of claim 1 wherein said means cooperative with said minor apertures include a read winding on the minor aperture of each of said transfluxors for receiving read pulses capable of reversing the flux direction around said minor aperture and sense windings on said minor apertures for sensing the changes of the flux around said minor apertures.

3. An EXCLUSIVE OR circuit comprising a transfluxor having a major and a minor aperture, the latter being formed of an inner and an outer leg of magnetic material:

the magnetic flux path of said transfluxor comprising said inner and outer leg together with the magnetic material around said major aperture which includes said inner leg;

means for setting said transfluxor to a first blocked state by saturating substantially all of the magnetic material in said magnetic flux path in one stable direction of magnetic remanence;

a plurality of write windings on the major aperture for receiving selectively generated write pulses, each of said write pulses being controlled in amplitude so as to be capable of switching the flux around said major aperture to the opposite direction of magnetic remanence while leaving the direction of magnetization of the outer leg of said minor aperture unchanged;

the reception of a single write pulse by one of said write windings causing said transfluxor to assume an unblocked state, the coincident reception of a plurality of write pulses by the associated write windings causing substantially all of the magnetic material in said magnetic flux path to become saturated in the opposite direction of magnetic remanence thereby placing said transfluxor in a second blocked state;

a read winding on said minor aperture for receiving read pulses capable of reversing the flux direction around said minor aperture if said transfluxor is in the unblocked state; and a sense winding on said minor aperture for sensing flux changes around said minor aperture in response to said read pulses.

4. The EXCLUSIVE OR circuit as defined in claim 3 wherein said means for setting said transfluxor to a first blocked state comprises a winding coupled to said major aperture.

5. A half adder circuit comprising:

a first and a second transfluxor for generating sum and carry outputs respectively, each of said transfluxors having a major and a minor aperture;

means for setting said transfluxors to a blocked state;

first and second winding means associated with the major apertures of both of said transfluxors for receiving selectively generated write pulses, each of said write pulses providing enough current for unblocking said sum transfluxor and half of the current necessary for blocking said carry transfluxor;

means coupled to the minor apertures of said transfluxors for receiving read pulses capable of reversing the direction of flux around said minor aperture of said sum and said carry transfluxors when the respective transfluxors are unblocked; and sum and carry windings coupled to the minor aperture of said sum and carry transfluxors respectively for sensing flux changes around the minor aperture of said respective transfluxors.

6. The circuit of claim 5 wherein said first and second winding means each have half as many turns on said second transfluxor as they have on said first transfluxor.

7. A full adder circuit comprising:

first, second and third transfluxors each having a major and a minor aperture;

means for setting said transfluxors to a blocked state;

first, second and third winding means each coupled to the major apertures of all of said transfluxors for receiving selectively generated pulses, said pulses each providing the sufficient current for setting said first transfluxor to the unblocked state and providing a third of the current necessary for setting said second transfluxor to the unblocked state and half of the current necessary for setting said third transfluxor to the unblocked state;

reading means coupled to the minor apertures of all of the transfluxors for receiving read pulses capable of reversing the direction of flux around the minor apertures of the transfluxors which are in the unblocked state;

sum winding means coupled to the minor apertures of said first and second transfluxors for sensing flux changes around the minor apertures of said first and second transfluxors; and carry winding means coupled to the minor apertures of said second and third transfluxors for sensing flux changes around the minor apertures of said second and third transfluxors.

8. The circuit of claim 7 wherein said first, second and third winding means each have one-third as many turns on said second transfluxor as on said first transfluxor and half as many on said third transfluxor as on said first transfluxor.